United States Patent [19]

Bellmer

[11] Patent Number: 4,832,590
[45] Date of Patent: May 23, 1989

[54] PREPARATORY STATION FOR FACILITATING THE INTERCHANGE OF PRE-FORMING BAR ASSEMBLIES IN AN EXTRUSION HEAD

[75] Inventor: Klaus Bellmer, Ronnenberg, Fed. Rep. of Germany

[73] Assignee: Hermann Berstorff Maschinenbau GmbH, Hanover, Fed. Rep. of Germany

[21] Appl. No.: 169,441

[22] Filed: Mar. 17, 1988

[30] Foreign Application Priority Data

Mar. 20, 1987 [DE] Fed. Rep. of Germany ....... 3709248

[51] Int. Cl.⁴ ............................................. B29C 47/08
[52] U.S. Cl. .................................. 425/185; 425/186; 425/192 R
[58] Field of Search ............... 425/185, 186, 188, 190, 425/192 R; 764/181

[56] References Cited

U.S. PATENT DOCUMENTS

| | | | |
|---|---|---|---|
| 4,221,258 | 9/1980 | Richard | 164/181 |
| 4,358,261 | 11/1982 | Ohki | 425/131.1 |
| 4,462,783 | 7/1984 | Hehl | 425/190 |
| 4,619,599 | 10/1986 | Herbert et al. | 425/186 |
| 4,652,410 | 3/1987 | Inoue et al. | 264/39 |
| 4,653,994 | 3/1987 | Capelle | 425/131.1 |
| 4,698,007 | 10/1987 | Hehl | 425/190 |
| 4,737,095 | 4/1988 | Hehl | 425/190 |
| 4,758,147 | 7/1988 | Inaba | 425/186 |

FOREIGN PATENT DOCUMENTS 2131734B 9/1986 United Kingdom .

*Primary Examiner*—Jay H. Woo
*Assistant Examiner*—Khanh P. Nguyen
*Attorney, Agent, or Firm*—Foley & Lardner, Schwartz, Jeffery, Schwaab, Mack, Blumenthal & Evans

[57] ABSTRACT

A preparatory station for pre-forming bar assemblies intended for use in conjunction with multiple extrusion head for producing rubber profiles for tread strips of automobile tires includes a plurality of chambers receiving said bar assemblies from said extruder head and for accommodating replacement assemblies, means being provided for heating the accommodation chambers, and further including arrangements for ejecting the pre-forming bar assemblies from the extrusion head and for removing the splicing or jointing bar assemblies and the profile bar assemblies from the pre-forming bar assemblies.

7 Claims, 6 Drawing Sheets

PREPARATORY STATION FOR FACILITATING THE INTERCHANGE OF PRE-FORMING BAR ASSEMBLIES IN AN EXTRUSION HEAD

The present invention relates to a preparatory station for facilitating the interchange of pre-forming bar assemblies in an extrusion head. More particularly, the present invention relates to a preparatory station for pre-forming bar assemblies suitable for incorporation in an extrusion apparatus utilised for producing rubber profiles destined to form the tread strips of vehicle tires.

BACKGROUND OF THE INVENTION AND PRIOR ART DISCUSSION

In order to produce a tread strip for automotive vehicle tyres, it is generally necessary for a number of different types of rubber mixtures to be combined. Thus, there is required a tread surface mixture which is made of a highly wear-resistant material, a shoulder strip mixture which is made of highly compressible material, a so-called "lower" rubber mixture which forms the bottom layer of the tread surface and may be softer than the tread surface, and the so-called "rubber pad" mixture to ensure good adhesion of the tread strip to the carcase of the tire.

These four mixtures have markedly different viscosities but must, nevertheless, be brought together in a single extrusion head to form a tread strip profile. This necessitates the provision of special measures in respect of the flow channels through which each mixture passes.

British Patent Specification No. 21 31 734B discloses an extrusion apparatus for producing flat profiles from two different types of mixtures. The extrusion head forming part of the extrusion apparatus is divided into two planes located one above the other. The head comprises a central portion which is fixedly connected to the extrusion devices, and upper and lower portions which are pivotable towards and away from the central portion. Flow channel inserts for each of the mixtures are provided in such an arrangement and are disposed, in the operative position of the head, between the central portion and one of the upper and lower portions.

It is necessary for the head portions to be pivotable so that the flow channel inserts of the head can periodically be changed or cleaned. Thus, the inserts may need to be changed if a different rubber or elastomeric mixture is to be used in one or all of the extrusion devices, or inserts with different flow channels and different pre-forming bar assemblies may also be required if the final profile is to be altered. The pivotability of the head portions means that the flow channels can be used in an optimum manner in the head.

In many instances of use, the profile strips need to be changed relatively frequently. For example, they need to be changed in order to produce tread strips for tyres of different sizes for cars or lorries or for producing special tyres for earth moving machines. Each change in the type of tread strip results necessitates the change of both the flow channel inserts and the pre-forming bar assembly.

After the pivotable head portions have been pivoted away from the central portion using hydraulic means, the flow channel inserts are extracted utilising hydraulic piston and cylinder arrangements. The insert members are secured to the piston rods for such arrangement by means described in U.S. Pat. No. 4,619,599.

The pre-forming bar assemblies, which are disposed at the outlet of the head, have, hitherto, been removed manually. They are then gripped by a crane or hoist and replaced by new bar assemblies defining different flow channels and profile bars.

OBJECT OF THE INVENTION

The present invention seeks to provide a preparatory station for facilitating the interchange of the pre-forming bar assemblies so that they can be replaced extremely rapidly, whereby adapting the machine when the type of tread strips being produced is being altered can be effected within a very short period of time.

SUMMARY OF THE INVENTION

According to the present invention, there is provided a preparatory station for pre-forming bar assemblies intended for use in conjunction with a multiple extrusion head, said pre-forming bar assemblies comprising pre-forming bar means, said bar means including a housing defining inlet means for each material extruded through said multiple extrusion head, splicing or jointing bar means disposed within said housing and, together with said pre-forming bar means, defining flow channels for each mixture received through said inlets and profile bar means receiving said mixtures from said flow channels and combining said mixtures to form a single profile, wherein said preparatory station comprises a plurality of chambers for receiving said pre-forming bar assemblies from said extrusion head and for accommodating replacement pre-forming bar assemblies, heating means for heating said accommodation chambers and means for ejecting said pre-forming bar means, said splicing or jointing bar means and said profile bar means from said accommodation chambers, said ejection means including means for separating said three bar means from one another.

The pre-requisites for a rapid change of the pre-forming bar assemblies are met if such a preparatory station is provided with a plurality of heatable accommodation chambers for receiving the pre-forming bar assemblies and for accommodating replacement assemblies. The provision of ejection arrangements for ejecting both the pre-forming bar means and the nozzle of the bar means, that is to say, the profile bar means ensures that the component parts thereof, to which highly viscous rubber mixtures readily adhere, can be rapidly replaced. Considerable force would otherwise be necessary to effect a changeover operation if such ejection arrangements were not provided.

Preferably, the preparatory station is in the form of a carrousel. This only necessitates the displacement of the bar assemblies through very short distances which, in turn, promotes the rapid changeover of the bar assemblies.

However, short displacement paths can also be achieved if the accommodation chambers are disposed in vertical or horizontal stacks.

Desirably, said accommodation chambers comprise wall members, said wall members defining bores for the passage of a heating medium therethrough, said heating means further including rotational, temperature controlling means communicating with said bores.

Such heating of the preparatory station serves to keep any operational interruption to a minimum and, in particular, prevents the production of unusable tread strips. If the pre-forming bar assemblies were not preheated, they would require heating in the multiple extrusion head by the material passing therethrough. In such a case, until the operational temperature is attained, the external surfaces of the profile strip being produced will have relatively low temperatures and, in consequence, will also have a relatively low viscosity. As a result thereof, variable flow speeds will be set up within the cross-section of the profile, and such speeds cause weakening of the profile.

Once received in the preparatory station, the profile bar means can be separated from the pre-forming bar assembly by the provision of a fist hydraulic piston and cylinder arrangement, which arrangement includes an extensible piston rod which ejects said profile bar means. Thereafter, the same piston and cylinder arrangement is used to eject the remainder of the pre-forming bar assembly.

Subsequently, the pre-forming bar assembly may be displaced into a further position in which the splicing or jointing bar means is separated from the assembly by a second hydraulic piston and cylinder ejection arrangement. The splicing or jointing bar means may then be cleaned and, if necessary, replaced by another splicing or jointing bar means.

BRIEF DESCRIPTION OF THE DRAWINGS

The invention will be further described, by way of example, with reference to the accompanying drawings, in which:

FIG. 7 is a front elevational view, viewed in the direction VII of FIG. 3 with portions removed for the sake of clarity.

DESCRIPTION OF PREFERRED EMBODIMENTS

Figure 1:
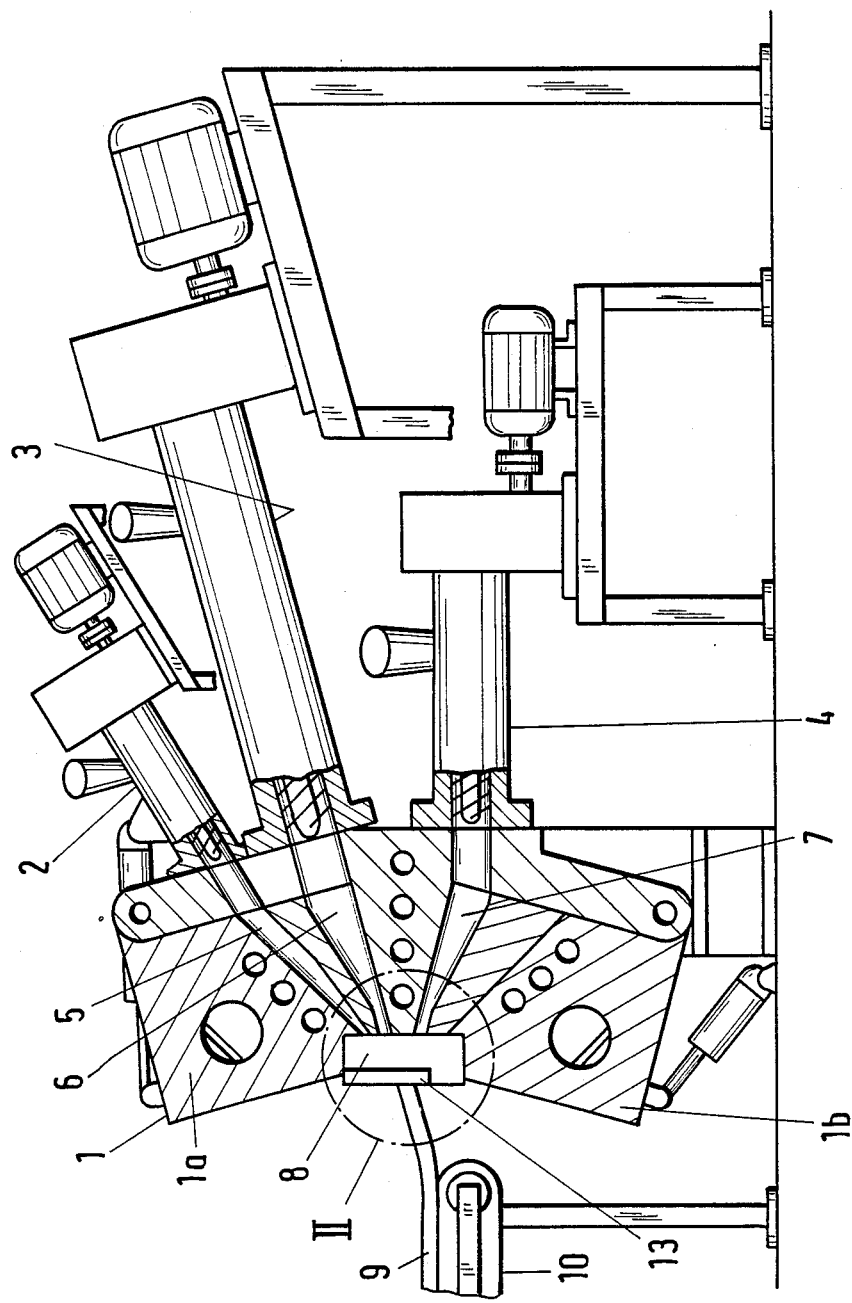
FIG. 1 is a schematic longitudinal sectional view through an extrusion apparatus suitable for producing tread strips and including a preparatory station in accordance with the present invention.

FIG. 1 is a schematic, longitudinal sectional view through an extrusion apparatus incorporating a preparatory station in accordance with the present invention. The extrusion apparatus is used for producing tread strips for vehicles and comprises a multiple extrusion head 1 which is fed with different rubber mixtures from extrusion devices 2, 3 and 4.

Each of the rubber mixture emanating from the extrusion devices 2, 3 and 4 is fed to a pre-forming bar assembly 8 through flow channels 5, 6 and 7 respectively. The channels 5, 6 and 7 contain flow channel inserts (not shown), and the rubber mixtures are combined to form a single tread strip 9. This is collected by a conveyor belt 10 and supplied to subsequent processing stations such as, for example, a shrinkage chamber, a cooling chamber and/or a cutting station for cutting the strip to a desired length.

Figure 2:
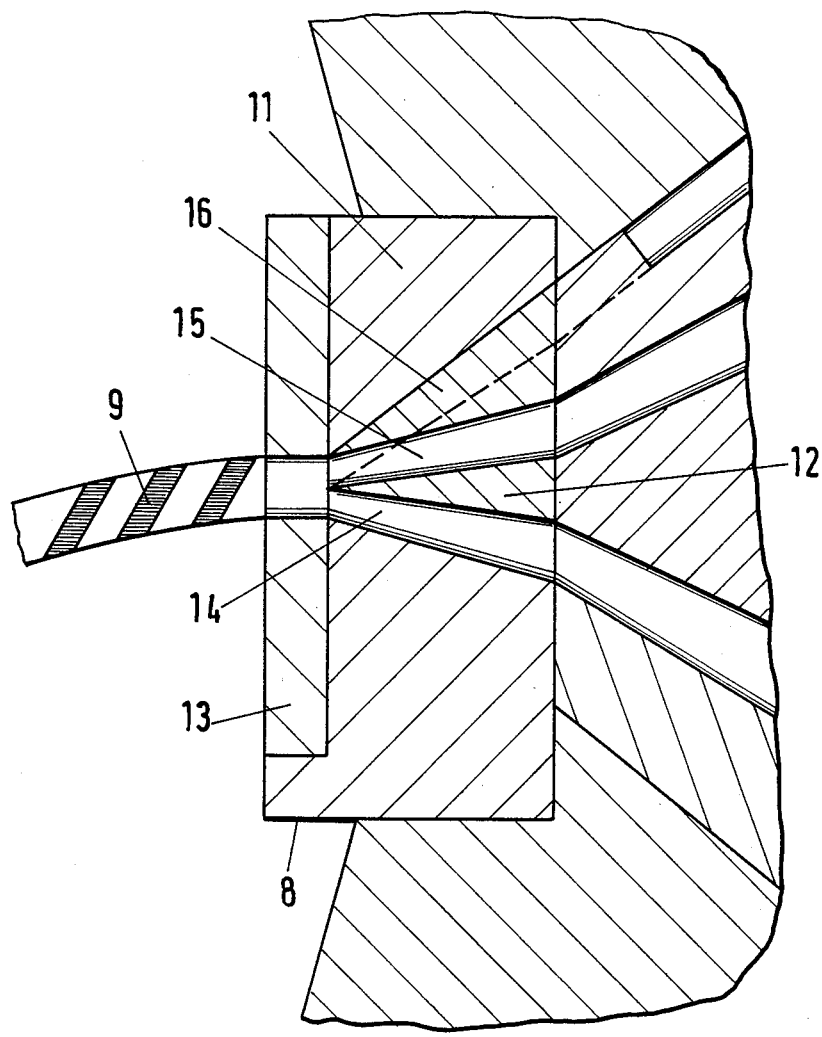
FIG. 2 shows, on an enlarged scale relative to FIG. 1, the detail ringed therein at II.

The pre-forming assembly 8 is shown, on an enlarged scale relative to FIG. 1, in FIG. 2. A housing 11 for the pre-forming bar 8 also accommodates a splicing or jointing bar 12. On the outlet side of the pre-forming bar 8, a profile bar 13 is located which gives the extruded tread strip 9 its definitive, outer form.

The splicing or jointing bar 12 defines channels 14,15 and 16 which bring together the rubber mixtures having different viscosities and compositions, to form the single extruded tread strip 9.

Any change in the desired type or size of the tread strip 9 necessitates a change in the entire pre-forming bar 8. Hitherto, this has been effected by opening the multiple head 1. To permit this, the head 1 has been provided with upper and lower portions 1a and 1b which are pivotable towards and away from a central portion. The upper portion 1a is pivoted away from the central portion utilising an hydraulic piston and cylinder arrangement. The pre-forming bar assembly is then removed by means of a hoist and is replaced by a new bar assembly which is provided with different splicing or jointing bars and a different profile bar. However, the effecting of such a replacement inevitably meant that production was interrupted for a long period of time. Since many changes of this nature may be necessary during each working shift, a considerable length of time has been wasted in effecting the changeover process and in restarting the apparatus.

In the present invention, however, a preparatory station is provided which comprises a plurality of chambers each of which accommodates a pre-forming bar assembly. This station is disposed laterally adjacent the multiple head 1 and is provided with heating arrangements for heating the pre-forming bar assemblies. The station also comprises a first discharge arrangement for discharging the profile bar and a second discharge arrangement for discharging the splicing or jointing bar.

Figure 3:
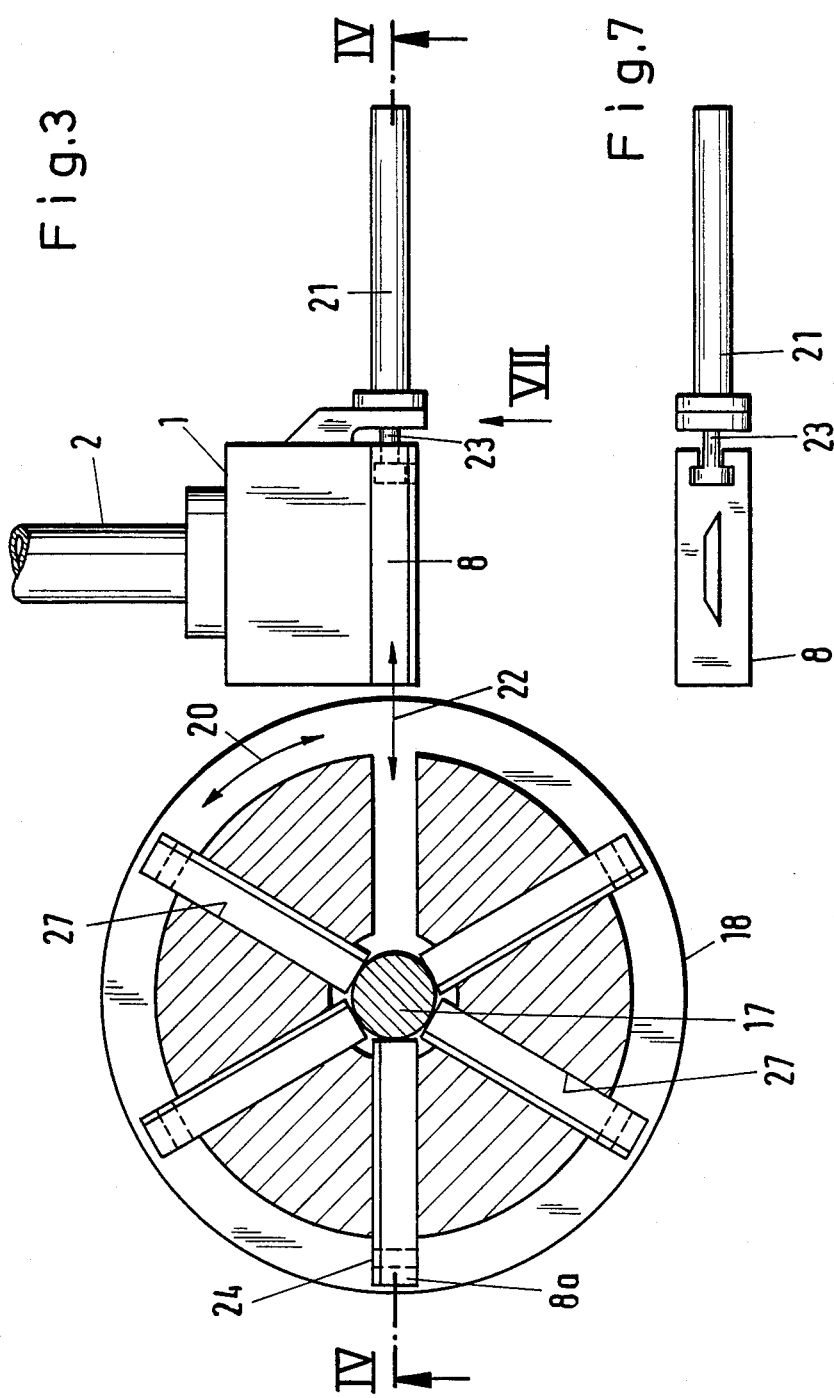
FIG. 3 is a plan view of a first embodiment of a preparatory station for pre-forming bar assemblies in accordance with the present invention.
Figure 4:
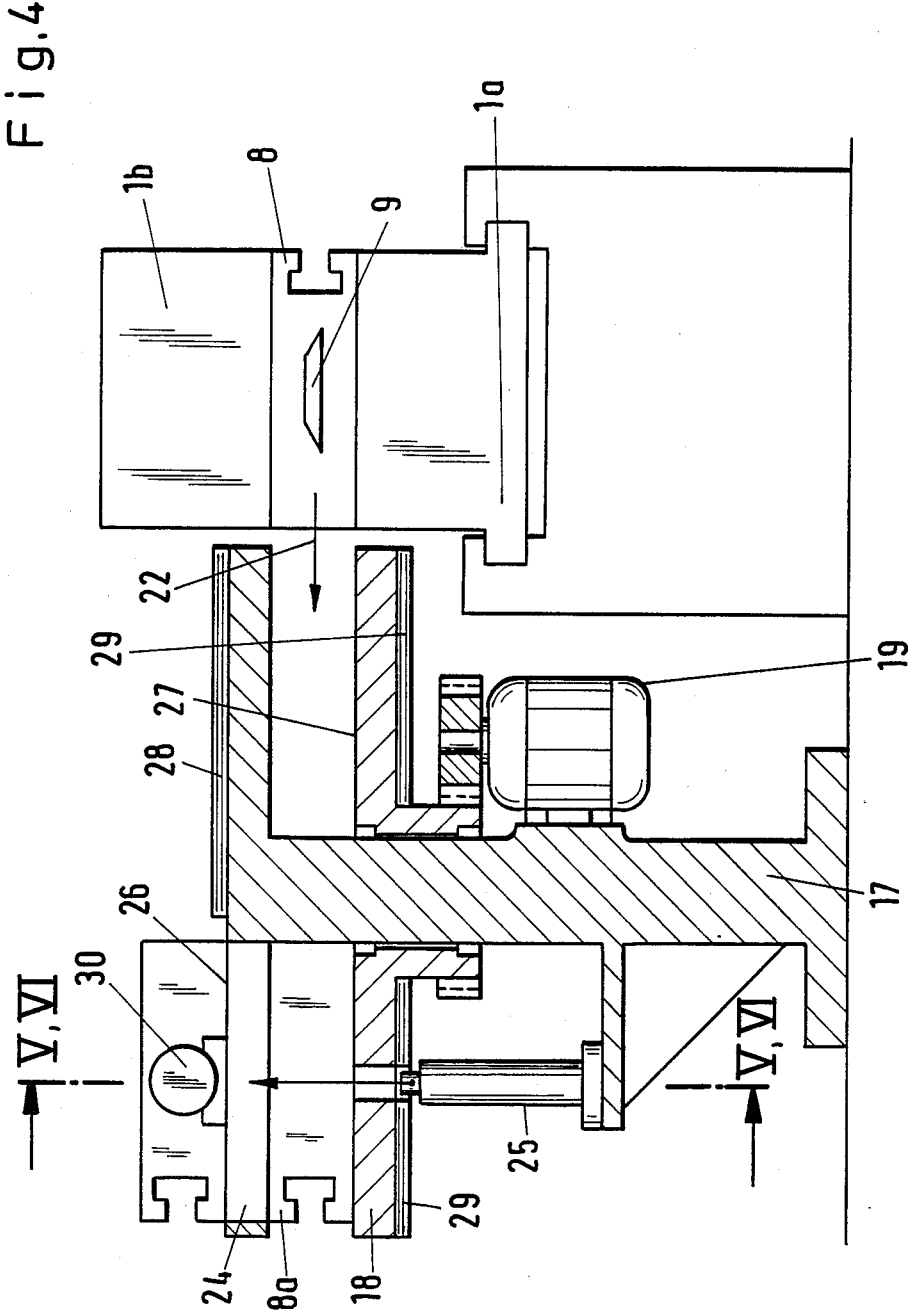
FIG. 4 is a cross-sectional view taken along the line IV—IV of FIG. 3.

FIGS. 3 and 4 illustrate one embodiment of such a preparatory station which is in the form of a carrousel. A carrousel 18 is rotatably mounted on a support column 17 and is rotatable into a desired position by means of a motor 19 (see FIG. 4), the directions of rotation being denoted by the arrow 20. In the embodiment shown, the carrousel 18 has six chambers 27 for accommodating pre-forming bar assemblies 8 of different configurations.

The pre-forming bar assembly 8 which is in its operative position shown in FIGS. 1, 3, 4 and 7, that is to say, disposed between the head portions 1a and 1b, is displaced into an accommodation chamber 27 on the carrousel 18 by means of an hydraulic piston and cylinder arrangement 21. Such displacement is effected in the direction of the arrow 22 in FIG. 4. The assembly 8 is detached from the piston rod 23 of the arrangement 21. For this purpose, the piston rod 23 may be provided with, for example, a dovetailed extension.

The carrousel 18 is rotated and a connection is established between the piston rod 23 and a new pre-forming bar assembly 8. The hydraulic piston and cylinder arrangement 21 then draws the new pre-forming bar assembly into its working position in which it is disposed between the head portions 1a and 1b. It will be readily apparent that only a short period of time is required for such a changeover operation to be effected.

The carrousel 18 is then rotated to displace the used pre-forming bar assembly, now denoted by 8a for the sake of clarity, into a cleaning position 24. In such position, the profile bar 13 is ejected upwardly from the chamber 27 by means of a hydraulic piston and cylinder arrangement 25 and is removed. The piston rod 25a of the arrangement 25 is retracted, the carrousel 18 is further rotated until the housing 11 of the pre-forming bar assembly is positioned above the discharging piston rod 25a. Thereafter, the pre-forming bar assembly is raised into its withdrawal position 26 by means of the discharging piston rod 25a of the hydraulic piston and cylinder arrangements 25.

Subsequently, whilst still in this position, a further hydraulic piston and cylinder arrangement 30, which includes a discharging piston rod 30a (shown in FIGS. 5 and 6), is used to remove the splicing or jointing bar 12 from the housing 11. The bar 12 can then be cleaned and/or a new splicing or jointing bar 12, which has different flow channels 14, 15 and 16 may be inserted into the housing 11. The use of the hydraulic piston and cylinder arrangements 25 and 30 considerably facilitates the cleaning and changeover operations, because the rubber residues remaining in the pre-forming bar assembly 8 are highly viscous and adhesive.

Figure 5:
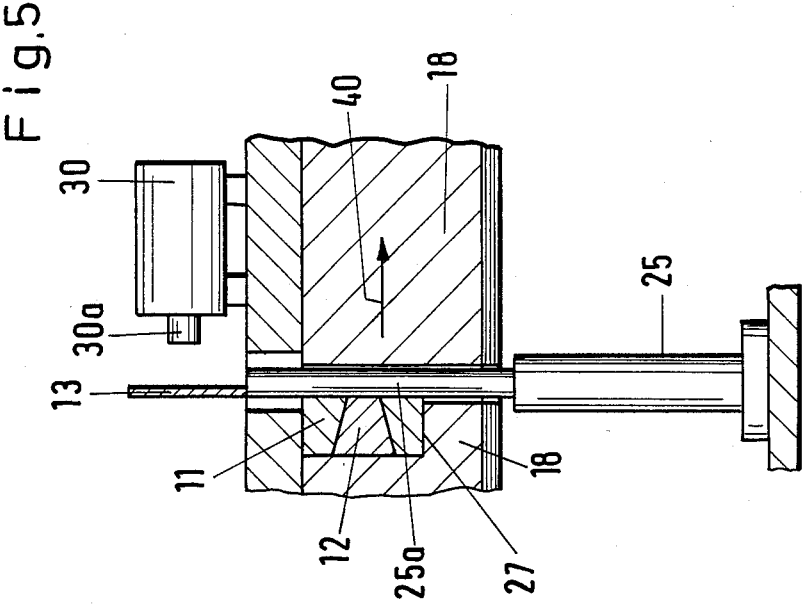
FIG. 5 is a cross-sectional view taken along the line V—V of FIG. 4 and which is identical to the cross-sectional view taken along the line V—V of FIG. 8.

After a new splicing or jointing bar 12 has been inserted into the housing 11, the pre-forming bar assembly 8a is returned into an accommodation chamber 27, as shown in FIG. 5, where it is available for re-use.

Heating arrangements 28 and 29 are provided for ensuring that the pre-forming bar assemblies 8 in the carrousel 18 are brought to, and are maintained at, a temperature which substantially corresponds to the temperature of use of the pre-forming bar assembly in the head 1. This measure ensures that no defects occur as a result of the use of a cold pre-forming bar assembly to which the rubber material would adhere most strongly. Such adhesion would alter the viscosity of the materials and the profile temperature and, hence, the flow speed would be adversely affected.

Figure 8:
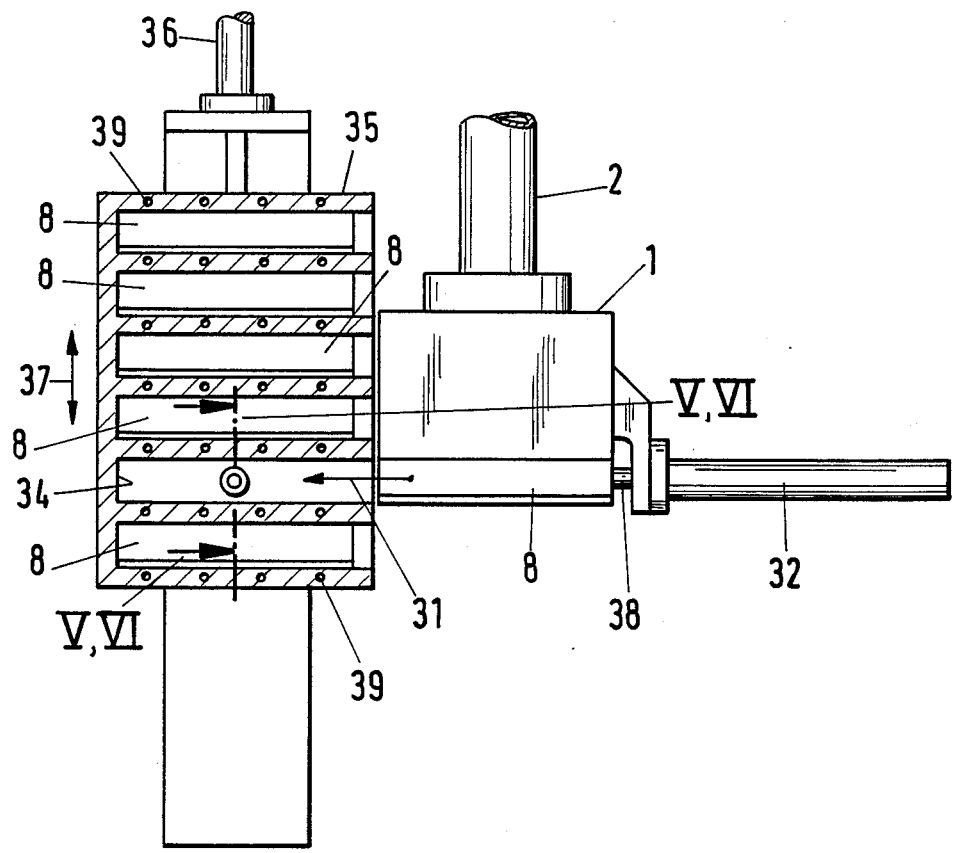
FIG. 8 is a plan view, partially in section through a further embodiment of a preparatory station.

FIG. 8 shows a plan view of an alternative embodiment of a preparatory station for exchanging pre-forming bar assemblies and similarities between this Figure and FIG. 3 will be readily apparent. In FIG. 8, however, the preparatory station is a shelf-type arrangement.

In this embodiment, a pre-forming bar assembly 8 is moved from its position of use in the multiple head 1 by means of a hydraulic piston and cylinder arrangement 32 including a piston rod 38. It is displaced, in the direction of the arrow 31, into a vacant accommodation chamber 34 of the self-type station 35.

The shelf-type station 35, which travels in guide means (not shown), is horizontally displaced by means of a hydraulic piston and cylinder arrangement 36 in one of the directions of the double-headed arrow 37 until a desired replacement pre-forming bar assembly 8 is situated in front of a piston rod 38. The bar assembly 8 is then connected to the rod 38 by means of a dove-tailed extension, and is displaced into the head 1. Temperature control channels 39 are provided in the shelf-type station so that the pre-forming bar assemblies 8 located in the accommodation chambers 34 are brought to the desired operational temperature.

Figure 6:
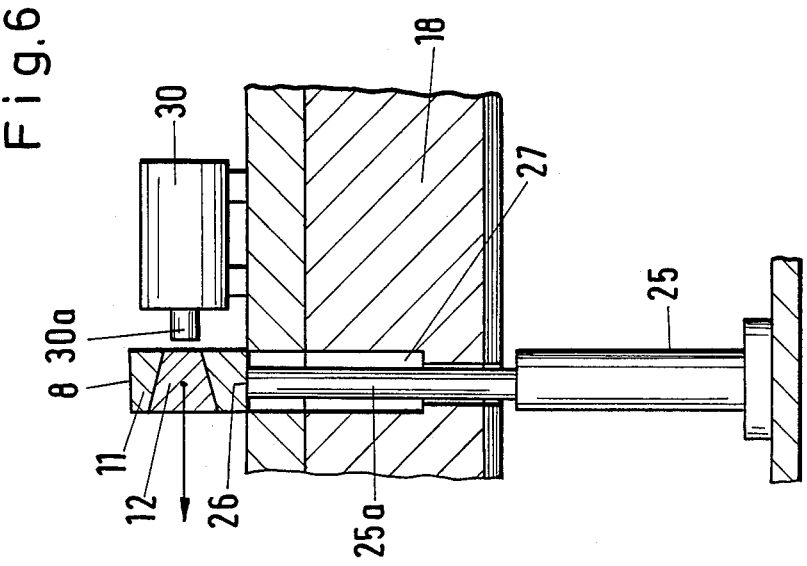
FIG. 6 is a cross-sectional view taken along the line VI—VI of FIG. 4 and which is identical to the cross-sectional view taken along the line VI—VI of FIG. 8.

The used pre-forming bar assembly is removed from the shelf-type station 35 by means of a hydraulic piston and cylinder arrangement similar to that shown in FIGS. 5 and 6. Thus, the profile bar 13 is initially ejected upwardly from the pre-forming bar assembly 8 by means of the discharging piston rod 25a of the hydraulic piston and cylinder arrangement 25 and is then removed. Subsequently, the discharging piston rod 25a is retracted into the hydraulic cylinder 25, and the shelf-type station is advanced slightly in the direction of arrow 40 until the housing 11 of the pre-forming bar is positioned above the hydraulic cylinder. By a renewed extension of the discharging piston rod 25a, the entire housing 11 of the pre-forming bar assembly 8 is then moved into the position shown in FIG. 6.

Subsequently, the splicing or jointing bar 12 is forced out of the housing 11 by means of the hydraulic piston and cylinder arrangement 30 and is cleaned and/or is replaced by a splicing or jointing bar having different flow channels. The procedure for inserting a new splicing or jointing bar is carried out in the reverse order to this removal process.

The arrangement shown in FIGS. 5 and 6 for ejecting the pre-forming bar from a preparatory station may be used both in the embodiment with the carrousel, as shown in FIGS. 3 and 4, and in the embodiment with the shelf-type station 35.

I claim:

1. A preparatory station for pre-forming bar assemblies intended for use in conjunction with a multiple extrusion head, said pre-forming bar assemblies comprising pre-forming bar means, said bar means including a housing defining inlet means for each material extruded through said multiple extrusion head, splicing or jointing bar means disposed within said housing and, together with said pre-forming bar means, defining flow channels for each mixture received through said inlets, and profile bar means receiving said mixtures from said flow channels and combining said mixtures to form a single profile, wherein said preparatory station comprises a plurality of accommodation chambers for receiving said pre-forming bar assemblies from said extrusion head and for accommodating replacement pre-forming bar assemblies, heating means for heating said accommodation chambers, means for transferring a used pre-forming bar assembly from said extrusion head into one of said accommodation chambers and for transferring a replacement pre-forming bar assembly from said accommodation chamber into said extrusion head, and ejection means separate from said transfer means and associated with at least one accommodation chamber for disassembling said pre-forming bar means, said profile bar means, and said splicing or jointing bar means.

2. A preparatory station as recited in claim 1, wherein said preparatory station is in the form of a carrousel.

3. A preparatory station as recited in claim 1, wherein said accommodation chambers are disposed in the form of a vertical stack.

4. A preparatory station as recited in claim 1, wherein said accommodation chambers are disposed in the form of a horizontal stack.

5. A preparatory station as recited in claim 1, wherein said accommodation chambers comprise wall members, said wall members defining bores for the passage of a heating medium therethrough said heating means further including rotational, temperature controlling means communicating with said bores.

6. A preparatory station as recited in claim 1, wherein said ejection means comprises a first hydraulic piston and cylinder arrangement for jointly ejecting said pre-forming bar means and said splicing or jointing means.

7. A preparatory station as recited in claim 6, wherein said ejection means comprises a second hydraulic piston and cylinder arrangement for ejecting said splicing or jointing bar means from said pre-forming bar means.

* * * * *